Sept. 22, 1936.　　　　C. C. FOSTER　　　　2,054,974
TRAFFIC SIGNAL INDICATING DEVICE
Filed July 1, 1935　　　2 Sheets-Sheet 1
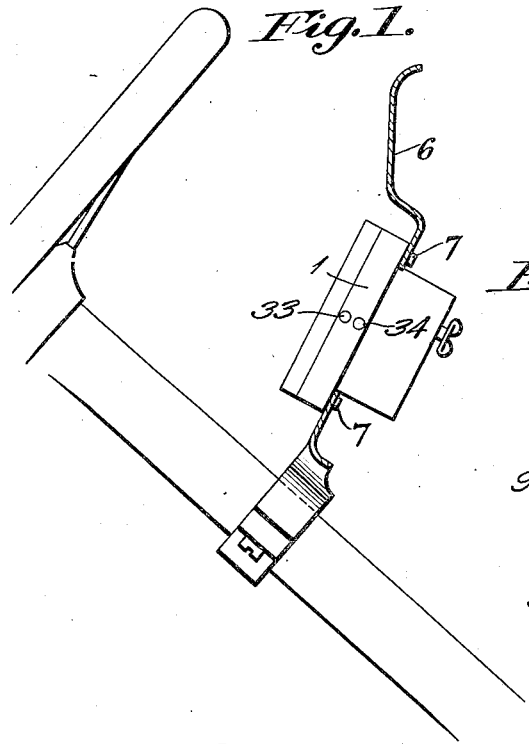
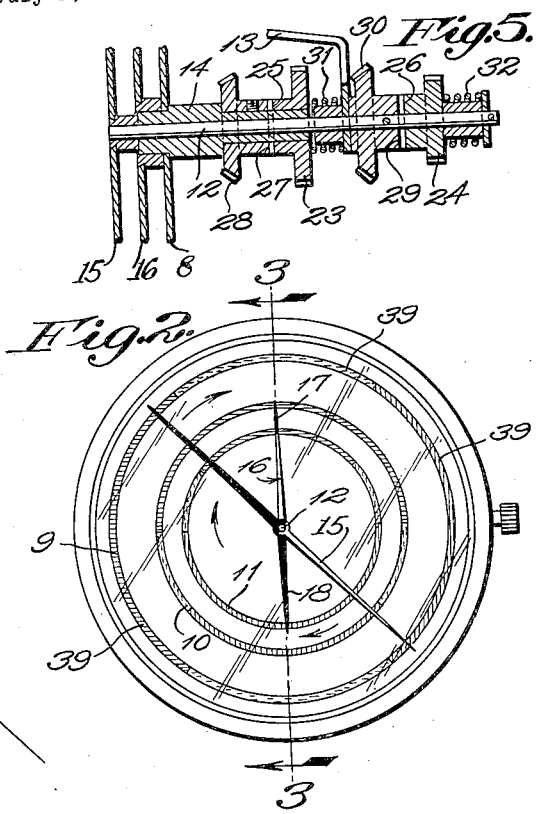
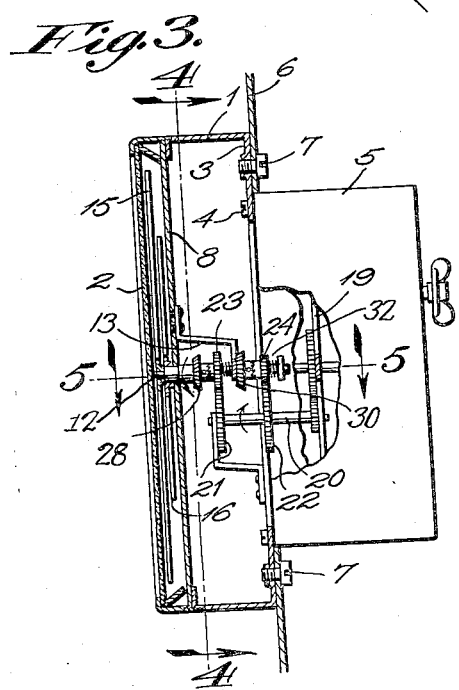
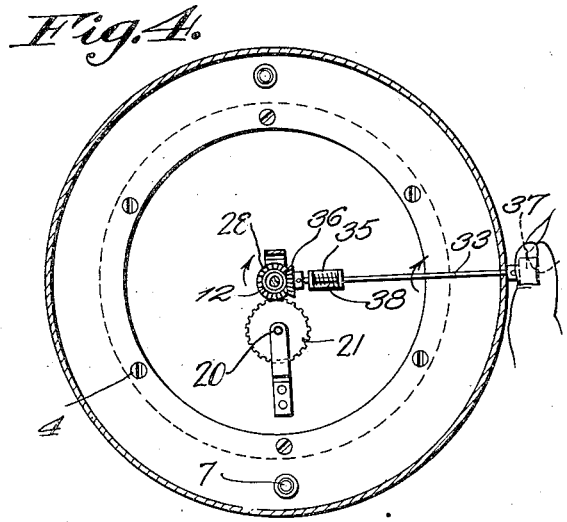
Carroll C. Foster
INVENTOR
BY Victor J. Evans & Co.
ATTORNEY
R. E. Wise.
WITNESS Sept. 22, 1936.  C. C. FOSTER  2,054,974
TRAFFIC SIGNAL INDICATING DEVICE
Filed July 1, 1935  2 Sheets-Sheet 2
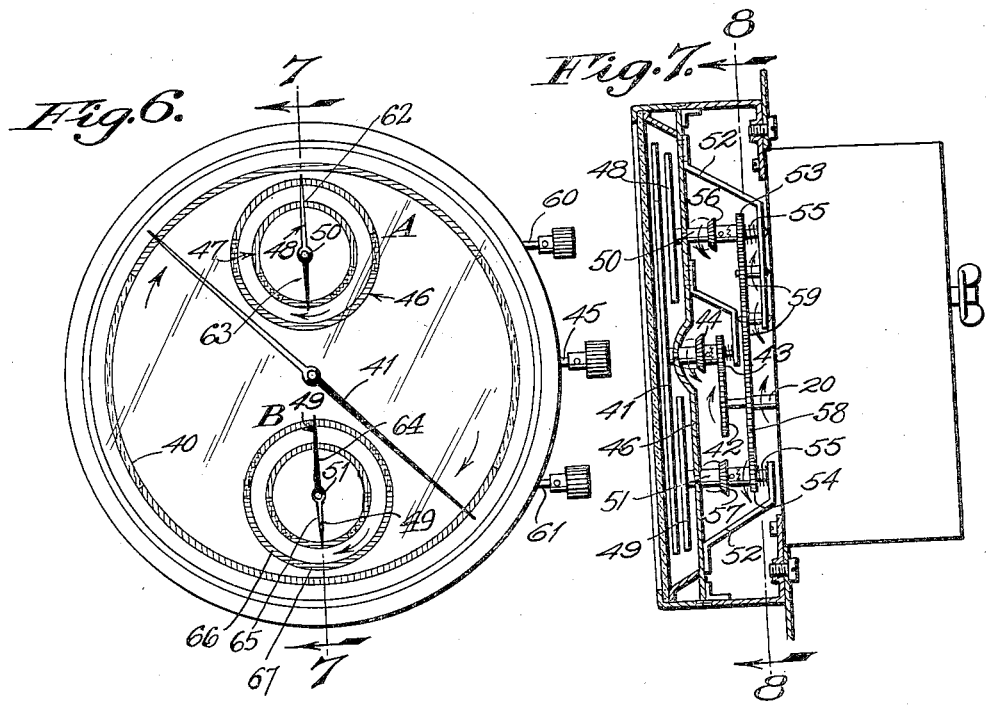
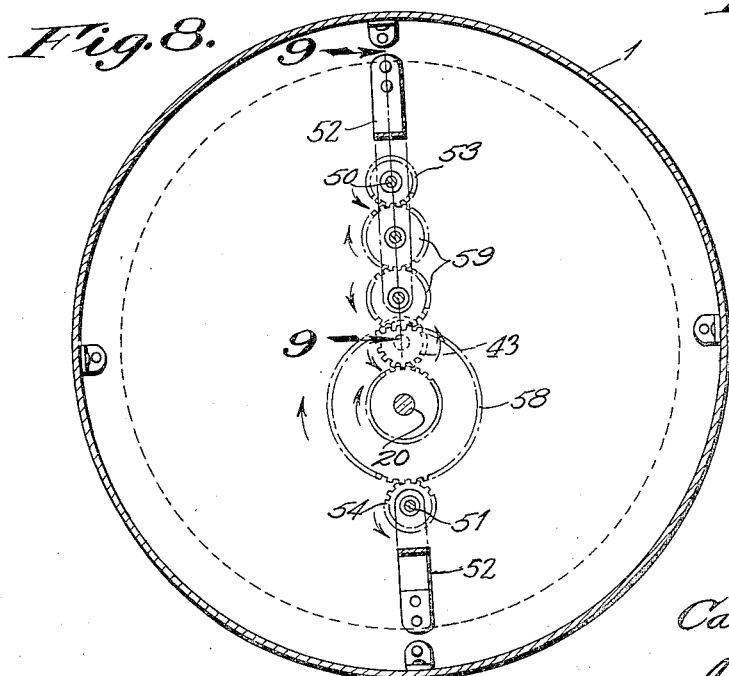
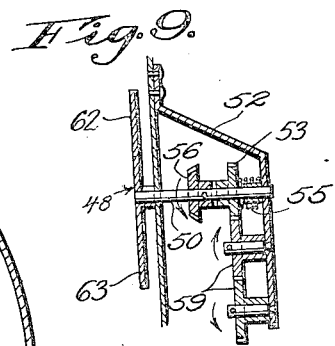
Carroll C. Foster
INVENTOR
BY Victor J. Evans & Co.
ATTORNEY
R. E. Wise.
WITNESS Patented Sept. 22, 1936

2,054,974

UNITED STATES PATENT OFFICE 2,054,974

TRAFFIC SIGNAL INDICATING DEVICE

Carroll C. Foster, Astoria, N. Y.

Application July 1, 1935, Serial No. 29,403

2 Claims. (Cl. 161—15)

My invention relates to indicating devices for use on automobiles to indicate to the driver the exact condition of the lights of a traffic signalling system.

The primary object of my invention, generally stated, is to provide for indicating on the instrument panel of an automobile, the colors of the signal lights at street intersections and for periods corresponding in time to the duration of said lights so that the driver may be advised of the time that the light at the nearest intersection has been on and the period elapsing before said light changes in color.

Another object is to provide an indicating device, for the purpose above set forth, which is readily attachable to the instrument panel of an automobile and operative for indicating the cycle of changes of a traffic signalling system of differently colored lights in colors corresponding to the colors of said lights and for periods corresponding in time to the duration of said lights.

Another object is to provide for accurately indicating on said instrument panel the cycle of changes of such signal lights in corresponding color and timing on a street extending in one direction and also on a cross street so that the operator of the automobile, when turning into said cross street, may drive by said device with the lights of said cross street.

Other and subordinate objects will appear and the nature of my improvements will be readily understood when the following description and claims are read in conjunction with the accompanying drawings.

In said drawings:

Figure 1 is a fragmentary view of a portion of the instrument panel of an automobile having my invention attached thereto.

Figure 2 is a view in front elevation of a preferred embodiment of my invention.

Figure 3 is a view in vertical transverse section, parts shown in elevation, taken on the line 3—3 of Figure 2 and drawn to an enlarged scale.

Figure 4 is a view in section taken on the line 4—4 of Figure 3 looking in the direction indicated by the arrows.

Figure 5 is a detailed sectional view taken on the line 5—5 of Figure 3.

Figure 6 is a view in front elevation of a modified form of my invention.

Figure 7 is a view in vertical transverse section, partly in elevation, taken on the line 7—7 of Figure 6 looking in the direction indicated by the arrows and drawn to an enlarged scale.

Figure 8 is a view in section taken on the line 8—8 of Figure 7 looking in the direction indicated by the arrows and drawn to a further enlarged scale and Figure 9 is a detailed sectional view taken on the line 9—9 of Figure 8 looking in the direction of the arrows.

Referring to the drawings, in its preferred embodiment, my invention comprises a cylindrical flat casing 1 having suitably secured at the front thereof a sight glass 2 and formed with an interior radial flange 3 around its rear edge to the rear face of which is secured, as by screws 4, a smaller casing 5. The device is secured to the instrument panel 6 of an automobile, as by screws 7, passing through said panel and flange 3.

Within the casing 1 and spaced from the glass 2 is a circular dial plate 8 having delineated thereon, concentrically thereof three circular bands 9, 10, and 11, respectively, of successively smaller diameter, as shown in Figure 2.

A shaft 12 disposed axially of said dial plate 8 projects through the same from the rear thereof. The shaft 12 is rotatably mounted intermediate its ends in a bracket 13, suitably secured to the dial plate 8, and at its forward end in a relatively shorter sleeve 14 having a bearing at its front end in said plate and rotatable on said shaft.

An indicator hand 15 is fixed intermediate its ends on the shaft 12 in front of the dial plate 8 so that its opposite ends overlie the larger band 9. A shorter hand 16 is secured intermediate its ends upon the forward end of said sleeve 14, in front of said dial plate 8, said hand 16 having a long arm 17 overlying the intermediate band 10 and a short arm 18 overlying the smaller band 11.

The shaft 12 and sleeve 14 are rotated, in a clockwise direction, independently, by means of a motor 19 mounted in the casing 5. Preferably the motor 19 has the form of an ordinary clock mechanism rotating a drive shaft 20 in a counter-clockwise direction as viewed from the front of the device. The shaft 20 may be mounted in any suitable manner in the casings 1 and 5, and is operatively connected to the shaft 12 and sleeve 14 as follows. A pair of gears 21 and 22, respectively, fast on the shaft 20 mesh with a pair of gears 23 and 24 freely and slidably mounted on the sleeve 14 and shaft 12 respectively. The gears 23 and 24 are each provided with a clutch face 25 and 26 for engagement, on the one hand, with a clutch face 27 on a beveled gear 28 fast on said sleeve 14 and, on the other hand, for engagement with a clutch face 29 formed on a beveled gear 30 fast on the shaft 14. Suitably arranged springs 31 and 32 urge the gears 23 and 24 into clutching engagement with the gears 28 and 30. A pair of setting shafts 33 and 34 are mounted in the casing 1 for manually setting the hands 15 and 16 respectively. The setting shafts 33 and 34 are mounted at right angles to the shaft 12 and sleeve 14 for endwise movement in fixed brackets, one of which is shown at 35, the outer ends of said shafts projecting outside said casing 1. Fast on the inner end of each setting shaft 33 and 34 is a beveled gear, one of which is shown at 36 in Figure 4, for engagement in the case of one shaft with the beveled gear 28 and in the other case with the beveled gear 30. A knob 37 is provided on the outer end of each setting shaft 33 and 34 for manual manipulation thereof. Suitably arranged springs, one of which is shown at 38, urge said setting shafts in a direction to disengage the beveled gears 36 with their related beveled gears 28 and 30. The arrangement of the clutch faces 25, 26, 27, and 29 are such that when the setting shafts 33 and 34 are rotated to set the hands 15 and 16 forward, the gears 23 and 24 are cammed, against the urge of the springs 31 and 32 out of clutching positions relative to the gears 28 and 30.

The foregoing operating connections between the motor 19 and the hands 15 and 16 are arranged and constructed to effect a complete rotation of said hands in correspondingly timed relation to the timing of a complete cycle of changes of the signal lights. The circular band 9 is divided into segments 39 corresponding in colors to the colors of the lights of the signal system and arranged so that one end of the hand 15, will traverse the segments 39 in the order corresponding to that of the light changes on a street extending in one direction, whereas, the other end of said hand will traverse said segments in the order of changes of the lights for cross streets. Preferably the two ends of the hand 15 are colored distinctively the first mentioned end being, for instance, silver and the other end black.

It may be stated that the hand 15 and band 9 are designed for use in connection with signal systems in which the light flashes of the red and green lights are of equal duration. Hence the red and green segments are of equal extent.

By means of the described arrangement of parts the driver of an automobile may, by a glance at one end of the arm 15 anticipate light changes, accurately, on the street on which he is driving and regulate his speed accordingly. Also he may turn into an intersecting street and drive by the other end of said hand with the lights on said intersecting street.

The smaller bands 10 and 11 and the hand 16 are for use in connection with signal systems in which the red and green lights are differently timed, as for instance the green light being on for a longer period than the red light for traffic going in one direction and the reverse being the case for cross traffic. Accordingly the larger band 10 of the two comprises a green segment larger than the red segment, whereas, the smaller band 11 comprises a red segment larger than the green one, the amber segments being of equal extent in each instance. The longer arm 17 traverses the larger band 10 and the shorter arm 18, the smaller band 11. The segments in the bands 10 and 11 are also arranged to be traversed by their respective ends of the hand 16 in the same order and timing as described with reference to the hand 15 and band 9.

In the modification shown in Figures 6 to 9, the device embodies a band 40 and hand 41 identical with that previously described with reference to the preferred form of the invention and substantially the same drive therefor including a gear 42 fast on the drive shaft 20 and meshing with a gear 43 adapted to be clutched to a beveled gear 44 the latter operable by a setting shaft 45 all as previously described with reference to said preferred form.

In this form of the invention, the dial plate has delineated thereon two opposed sets A and B of circular bands, the set A comprising two bands 46 and 47 concentrically arranged one within the other, and the set B comprises two bands 66 and 67 concentrically arranged one within the other. Cooperating with said sets of bands are indicator hands 48 and 49, respectively, fast upon shafts 50 and 51, respectively, journaled in the dial plate and fixed brackets 52. The hand 48 comprises a long arm 62 and a short arm 63, and the hand 49 comprises a long arm 64 and a short arm 65, the longer arms for traversing the larger band and the shorter arms for traversing the smaller band. Said shafts 50 and 51 have mounted thereon slidable gears 53 and 54 tensioned by springs 55 to clutch beveled gears 56 and 57 fast on the shafts 50 and 51 in the same manner as described with reference to the drive for the shaft 12 and sleeve 14. The gears 53 and 54 are driven in a clockwise direction, as viewed from the front of the dial plate, by a large gear 58 fast on the drive shaft 20 and meshing with the gear 54 and a train of idler gears 59 between said gear 58 and the gear 53. As will be seen by reference to Figures 7 and 8 the gears 42 and 43 drive the hand 41 at one speed and the gears 58 and 59 drive the hands 48 and 49 at a faster speed. Setting shafts 60 and 61 are provided for the hands 48 and 49, respectively, and operatively related thereto in the manner described with reference to the setting shafts 33 and 34.

The set A of bands is designed for use with signal systems in which the duration of the red and green lights is either equal or unequal, but in which the cycle of changes of the signals is differently timed than in the system for which the hand 41 and band 40 are designed to be used. Accordingly the outer band 46 of said set is divided into red and green segments of equal extent and the inner band 47 into red and green segments of unequal extent. The other set B of bands 66 and 67 are designed for use in connection with signal systems in which, on the one hand, the green signal is longer than the red signal, and on the other hand in which the red signal is longer than the green signal. Accordingly the outer band of this set is divided into red and green segments, the green being of a greater extent than the red, and the inner band 67 into red and green segments, the red being of greater extent than the green. As in the case of the other set, this last mentioned set is designed for use in connection with signal systems in which the cycle of changes is differently timed than in the system with which the hand 41 and the band 40 are designed to be used.

From the foregoing, it will be seen that the device of my invention is adapted for use in connection with various traffic signalling systems in which the period of duration of the red and green lights is either equal or unequal and in which the cycle of signal changes in the systems is differently timed.

The foregoing constitutes a detailed description of a preferred embodiment of my invention and certain modifications thereof, but it is to be understood that the invention is susceptible of order and further modifications without departing from the spirit thereof and right is herein reserved to all such modifications falling within the scope of the appended claims.

What I claim is:

1. An indicator for use with traffic signal systems of differently colored lights successively displayed for fixed periods and comprising, a dial plate having thereon circularly arranged segments corresponding in color to the colors of said lights, an indicator hand having its ends disposed over said segments, and means for moving said hand and said segments relatively to each other to indicate the segments in color correspondence with the display of said lights and in correspondingly timed relation to the periods of display of said lights, one end of said hand indicating said segments in correspondence with the lights for traffic travelling in one direction and the other end thereof indicating said segments in correspondence with the lights for cross traffic.

2. An indicator for use with traffic signal systems of differently colored lights successively displayed for fixed periods and comprising, a dial plate having thereon circularly arranged segments corresponding in color to the colors of said lights, an indicator hand having its ends disposed over said segments, and means for moving said hand and said segments relatively to each other to indicate the segments in color correspondence with the display of said lights and in correspondingly timed relation to the periods of display of said lights, one end of said hand indicating said segments in correspondence with the lights for traffic travelling in one direction and the other end thereof indicating said segments in correspondence with the lights for cross traffic, and the said ends of hands being differently colored.

CARROLL C. FOSTER.